United States Patent
Kim et al.

(10) Patent No.: US 8,194,522 B2
(45) Date of Patent: Jun. 5, 2012

(54) ASPHERIC LENS AND OPTICAL PICKUP INCLUDING THE SAME

(75) Inventors: Bong-gi Kim, Suwon-si (KR); Ichiro Morishita, Yokohama (JP); Soo-han Park, Yongin-si (KR); Joong-eon Seo, Yongin-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/645,989

(22) Filed: Dec. 23, 2009

(65) Prior Publication Data

US 2010/0165821 A1    Jul. 1, 2010

(30) Foreign Application Priority Data

Dec. 26, 2008  (KR) .......................... 10-2008-134953

(51) Int. Cl.
*G11B 7/00*    (2006.01)
(52) U.S. Cl. ............ 369/112.23; 369/44.23; 369/112.01
(58) Field of Classification Search .................. None
See application file for complete search history.

(56) References Cited

U.S. PATENT DOCUMENTS

| | | | |
|---|---|---|---|
| 4,824,225 A | 4/1989 | Nishioka | |
| 5,321,554 A | 6/1994 | Ishiyama et al. | |
| 7,457,224 B2 * | 11/2008 | Hirayama | 369/112.23 |
| 2003/0103266 A1 | 6/2003 | Wada | |
| 2003/0184881 A1 * | 10/2003 | Itonaga | 359/719 |
| 2008/0106998 A1 | 5/2008 | Ito | |

FOREIGN PATENT DOCUMENTS

GB    2188167    9/1987

OTHER PUBLICATIONS

European Search Report issued Mar. 24, 2010 in EP Application No. 09180756.0.
Smith, Warren J.: "Modern Optical Engineering" Jan. 1, 1990, McGraw-Hill Inc., USA, XP002572469, pp. 292-447 p. 293 figure 10.5.
Irving B R: "Code V Test Drive" May 1, 1989, Code V Test Drive, Optical Research Associates, pp. 1-29, XP007908609 the whole document.
European Examination Report Issued on Jan. 16, 2012 in EP Patent Application No. 09180756.0.
XP055015876 "Laser Beam Shaping Theory and Techniques" Edited by Fred M. Dickey, Scott C. Holswade. (ISBN: 0-8247-0398-7).

* cited by examiner

*Primary Examiner* — Muhammad N Edun
(74) *Attorney, Agent, or Firm* — Stanzione & Kim, LLP

(57) ABSTRACT

An aspheric lens includes at least one aspheric lens surface, and an angle of inclination on the aspheric lens surface is smaller than or equal to 65°. The aspheric lens surface is given by the equation $$Z(r) = \frac{cr^2}{1+\sqrt{1-(1+K)c^2r^2}} + Lr^2 + Ar^4 + Br^6 + Cr^8 + Dr^{10} + Er^{12} + Fr^{14} + Gr^{16} + Hr^{18} + Jr^{20}$$

where $L \neq 0$, c is a curvature, $r^2 = x^2 + y^2$, K is a conic integer, and L and A through J are aspheric coefficients.

15 Claims, 3 Drawing Sheets

ASPHERIC LENS AND OPTICAL PICKUP INCLUDING THE SAME

CROSS-REFERENCE TO RELATED APPLICATIONS

This application claims priority under 35 U.S.C. §119 from Korean Patent Application No. 10-2008-0134953, filed on Dec. 26, 2008, in the Korean Intellectual Property Office, the disclosure of which is incorporated herein in its entirety by reference.

BACKGROUND

1. Field of the Invention

The present general inventive concept relates to an aspheric lens that can be used as an objective lens in an optical information storage media system recording/reproducing information to/from an information storage medium, and to an optical pickup apparatus including the aspheric lens as an objective lens.

2. Description of the Related Art

Generally, an aspheric single objective lens is used to focus light onto an information storage medium in an optical information storage media system.

The most important factor in determining the storage capacity of an optical information storage medium, e.g., an optical disc, is the size of a light spot. When the size of a light spot is smaller, the size of marks or pits that can be recorded/reproduced is also smaller. Thus, the storage density of an optical disc can be increased.

To reduce the size of a light spot, a light source emitting a short wavelength light, such as blue laser, and an objective lens with a high numerical aperture (NA) are commonly used. For example, according to the Blue-ray disc (BD) standard, a blue light with an wavelength of approximately 405 nm and an objective lens with a NA of 0.85 are employed.

However, as the wavelength of light becomes shorter and the NA value of an objective lens becomes higher, an optical system employing the same becomes more vulnerable to various aberrations.

Therefore, when an aspheric single objective lens with a high NA is used for high density information storage media, such aberrations are compensated for by aspheric lens surfaces.

An aspheric surface equation generally used for designing an aspheric lens is as follows.

$$Z(r) = \frac{cr^2}{1 + \sqrt{1 - (1+K)c^2 r^2}} + Ar^4 + Br^6 + Cr^8 + Dr^{10} + Er^{12} + Fr^{14} + Gr^{16} + Hr^{18} + Jr^{20}$$ [Equation 1]

In Equation 1, $$\frac{cr^2}{1 + \sqrt{1-(1+K)c^2 r^2}}$$

indicates quadric surfaces such as spherical surfaces or elliptical surfaces, and the high degree (higher-order) terms from $r^4$ to $r^{20}$ are applied for correcting aberrations. As shown in Equation 1, the generally high terms from $r^4$ to $r^{20}$ are used in the case of an aspheric lens.

In case of an objective lens for BD, the NA is as high as 0.85. Thus, it is necessary to correct aberrations also in the periphery of the lens, which explains the use of high degree terms when designing the shape of an aspheric lens.

However, when high degree terms are used for designing a lens, variation of an aspheric surface becomes larger. Although this large variation significantly contributes to correct aberrations, the angle of inclination on the surface of the lens also becomes larger. In this case, the permitted axial deviation of the surfaces of the lens becomes smaller.

SUMMARY

The present general inventive concept provides an aspheric lens, which has gently sloped lens surfaces and allows increases in permitted axial deviation, and an optical pickup apparatus employing the aspheric lens as an objective lens.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an aspheric lens including at least one aspheric lens surface, wherein an angle of inclination on the aspheric lens surface may be smaller than or equal to 65°.

The aspheric lens surface may be given by the equation $$Z(r) = \frac{cr^2}{1 + \sqrt{1 - (1+K)c^2 r^2}} + Lr^2 + Ar^4 + Br^6 + Cr^8 + Dr^{10} + Er^{12} + Fr^{14} + Gr^{16} + Hr^{18} + Jr^{20}$$

where $L \neq 0$, c is a curvature, $r^2 = x^2 + y^2$, K is a conic integer, and L and A through J are aspheric coefficients.

The aspheric lens may be formed of a plastic material.

The aspheric lens may be used as an objective lens of an optical pickup for BD.

The NA (numerical aperture) of the aspheric lens may be 0.85.

The foregoing and/or other aspects and utilities of the present general inventive concept may also be achieved by providing an aspheric lens usable as an objective lens of an optical information storage media system, the aspheric lens including at least one aspheric lens surface which can be determined by equation having a first term corresponding to an elliptical surface characteristic; a second term corresponding to a parabolic surface characteristic: and higher-order terms corresponding to slope characteristics of the aspheric lens surface.

An angle of inclination on the aspheric lens surface formed the above terms of the equation may be smaller than or equal to 65°.

The first term may include $$\frac{cr^2}{1 + \sqrt{1-(1+K)c^2 r^2}},$$

and the second term may include $Lr^2$, wherein $L \neq 0$, c is a curvature, $r^2 = x^2 + y^2$, and K is a conic integer.

The second term may include $Lr^2$; and the higher-order terms may include $Ar^4 + Br^6 + Cr^8 + Dr^{10} + Er^{12} + Fr^{14} + Gr^{16} +$ $Hr^{18}+Jr^{20}$, wherein $L \neq 0$, c is a curvature, $r^2=x^2+y^2$, and L and A through J are aspheric coefficients.

The first term may include $$\frac{cr^2}{1+\sqrt{1-(1+K)c^2r^2}},$$

the second term may include $Lr^2$, and the higher-order terms may include $Ar^4+Br^6+Cr^8+Dr^{10}+Er^{12}+Fr^{14}+Gr^{16}+Hr^{18}+Jr^{20}$, wherein $L \neq 0$, c is a curvature, $r^2=x^2+y^2$, K is a conic integer, and L and A through J are aspheric coefficients.

An NA (numerical aperture) of the aspheric lens formed according to the above terms of the equation may be 0.85.

The foregoing and/or other aspects and utilities of the present general inventive concept may be achieved by providing an optical pickup apparatus including a light source to emit light, and an objective lens to transmit the light and receive the light reflected from an disc, wherein the objective lens includes an aspheric lens having an aspheric lens surface which can be determined by equation having a first term corresponding to an elliptical surface characteristic, a second term corresponding to a parabolic surface characteristic, and higher-order terms corresponding to slope characteristics of the aspheric lens surface.

The foregoing and/or other aspects and utilities of the present general inventive concept may also be achieved by providing an optical information storage media system including an optical pickup apparatus having a light source to emit light, and an objective lens to transmit the light and receive the light reflected from an disc, wherein the objective lens includes an aspheric lens having an aspheric lens surface which can be determined by equation having a first term corresponding to elliptical surface, a second term corresponding to a parabolic surface, and higher-order terms corresponding to slopes of the aspheric lens surface, and a control unit to control the optical pickup apparatus to write and read information using the light.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE EMBODIMENTS

Figure 1:
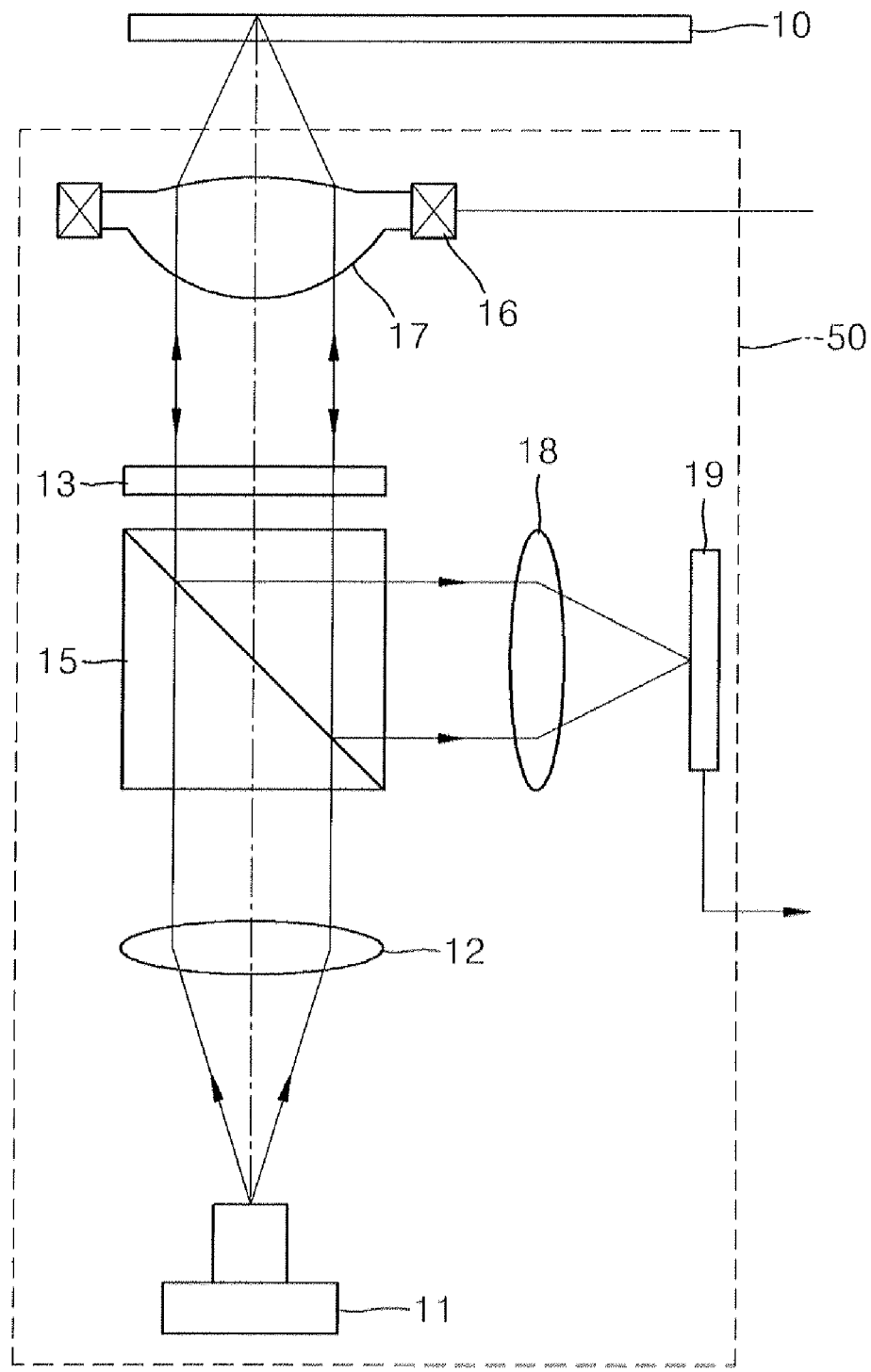
FIG. 1 is a diagram illustrating an optical pickup apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
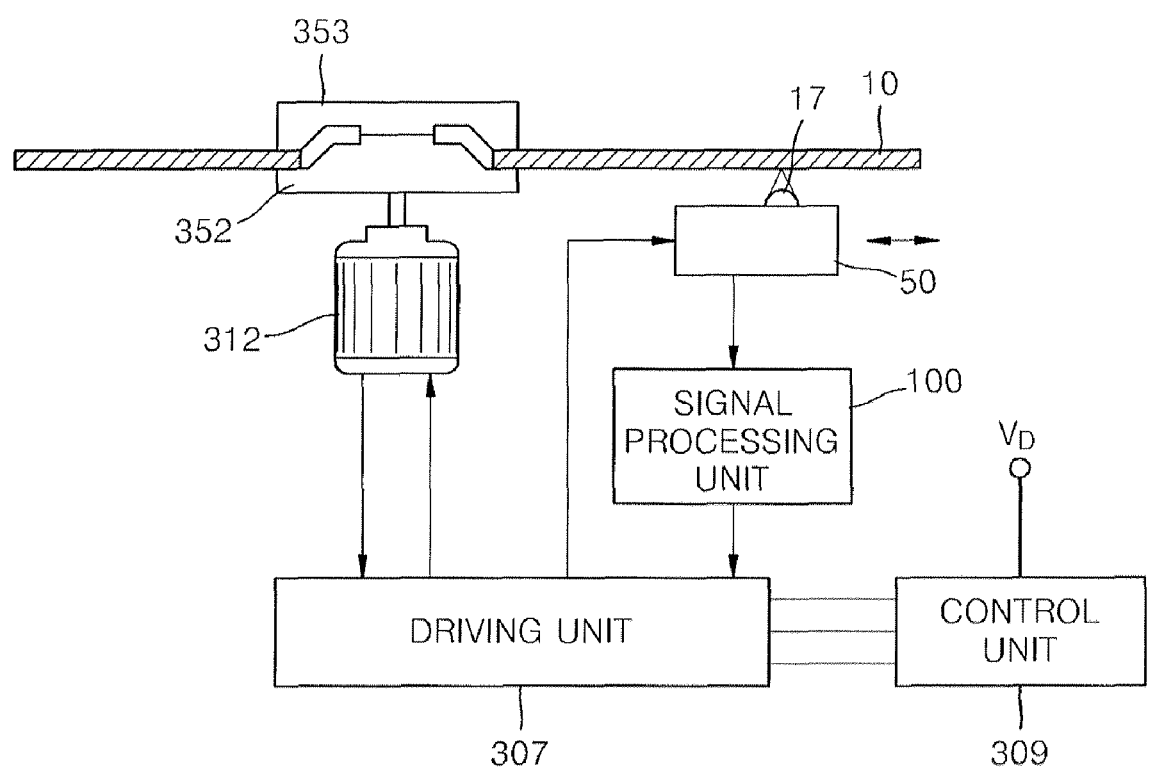
FIG. 2 is a diagram illustrating an optical information storage media system employing the optical pickup apparatus of FIG. 1.

FIG. 1 illustrates an optical configuration of an optical pickup apparatus 50 according to an embodiment of the present general inventive concept. FIG. 2 illustrates an optical information storage media system employing the optical pickup apparatus 50 of FIG. 1.

Referring to FIG. 1, the optical pickup apparatus 50 includes a light source 11 (e.g., a laser diode) to emit light, an objective lens 17 to collect incident light and focus the collected light onto an information storage medium, that is, an optical disc 10, and a photo detector 19 which receives light that is irradiated onto the optical disc 10 and reflected thereby. The objective lens 17 is an aspheric lens. Furthermore, the optical pickup apparatus 50 may includes a light path changer 15 (e.g., a polarizing beam splitter) to alternate or guide the travelling path of incident light, a wave plate 13 (e.g., a ¼ wave plate) to change the polarization of the incident light, and a collimating lens 12 to produce parallel light incident onto the objective lens 17. In FIG. 1, reference numeral 18 refers to a detecting lens which collects incident light and forms a suitable size light spot on the photo detector 19 using the collected light. The detecting lens 18 may be an astigmatism lens to detect focus error signals according to astigmatism methods.

The optical disc 10 may be an optical disc having a single information storage layer or a plurality of information storage layers on one side. The optical disc 10 may be a Blue-ray disc (BD).

The light source 11 outputs light having a wavelength appropriate for recording/reproducing information to/from the optical disc 10. For example, the light source 11 may output blue light according to the requirements of the BD standard, that is, blue light with a wavelength of 405 nm or close to 405 nm.

The objective lens 17 is driven in a focusing direction and/or a tracking direction by an actuator 16. The objective lens 17 may be formed to have an effective numerical aperture (NA) of 0.85 as required by the BD standard. Furthermore, to ensure compatibility with the standard for BD and HD DVD, that is, compatibility between the standards of the BD DVD and the HD DVD, the object lens 17 may also have an effective NA of 0.65 as required by HD DVD. The actuator 16 may drive the objective lens 17 not only in the focusing direction, but also in the tracking direction. Furthermore, the actuator 16 may also drive the objective lens 17 in the tilting direction.

According to an embodiment of the present general inventive concept, the aspheric lens can be used as the objective lens 17 and may have at least one aspheric lens surface on which an angle of inclination is smaller than or equal to 65°. The objective lens 17 may be formed of a plastic material or a glass material.

Figure 3A:
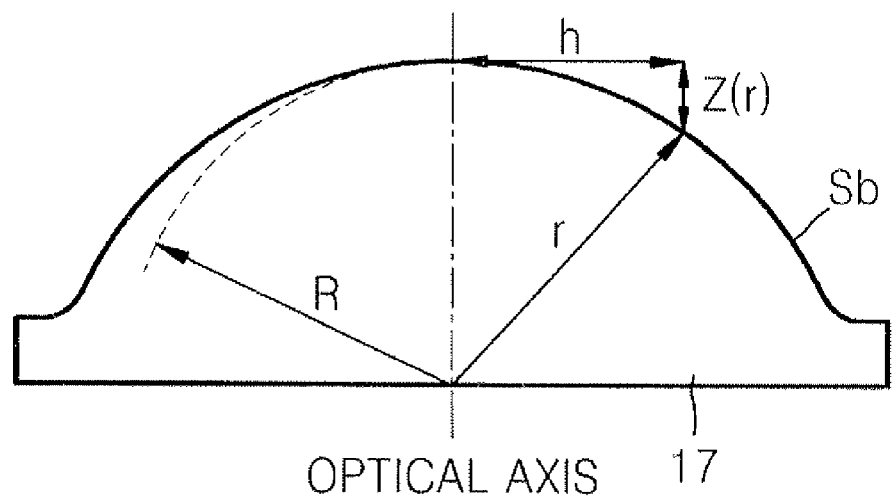
FIGS. 3A and 3B are diagrams illustrating an aspheric lens of the optical pickup apparatus of FIG. 1.
Figure 3B:
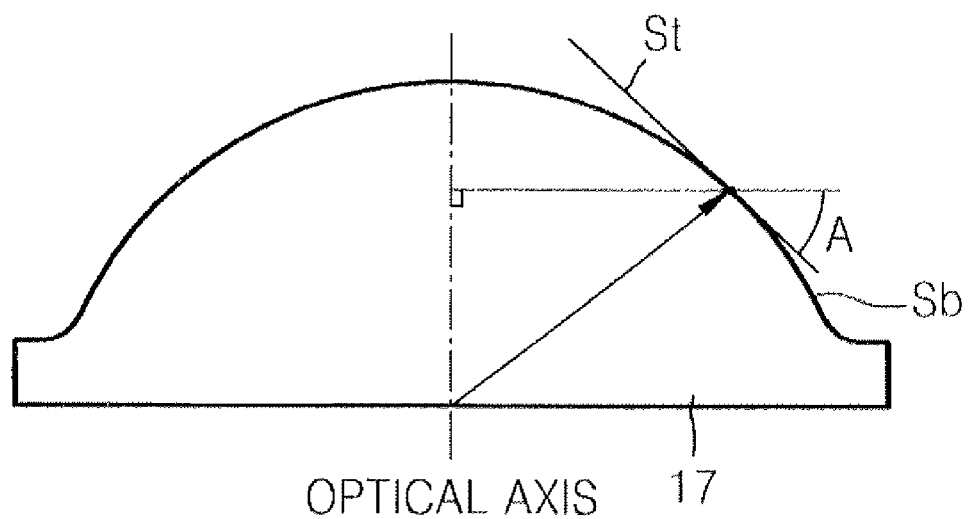

As illustrated in FIGS. 3A and 3B, the aspheric lens 17 may have an aspheric lens surface Sb. A reference R is a radius at the vertex on an optical axis, and reference r is a radius (or distance) to a point of the aspheric lens surface Sb from a reference surface at the optical axis. Reference h is a distance from the optical axis and proportional to the radius r. The above-described references are used to determine the aspheric lens 17 which will be described later.

Reference A indicates the angle of inclination and can be determined by the optical axis and a line (surface or plane) St that is tangential to a point of the aspheric lens surface Sb.

FIG. 1 illustrates an example of optical configurations of the optical pickup apparatus 50. The optical pickup apparatus 50 of FIG. 1 is a separated type optical system having the light source 11 and the photo detector 19 that are separated from each other, which includes the single light source 11 and the single photo detector 19. The light source 11 may be output light of a single wavelength. Alternatively, the light source 11 may be a multi-type light source which outputs lights of a plurality of wavelengths to ensure compatibility with optical discs of a plurality of formats; e.g., BD and/or HD DVD and conventional DVD. The optical pickup apparatus 50 may further include a hologram optical module (not illustrated) to ensure compatibility with optical discs of a plurality of formats for which lights of different wavelengths are used. Furthermore, the optical configuration of the optical pickup apparatus 50 may be modified variously from that illustrated in FIG. 1.

Referring to FIG. 2, an optical information storage media system may be an apparatus having a spindle motor 312 to rotate the optical disc 10, the optical pickup 50 which is installed to move across the optical disc 10 to record/reproduce information to/from the optical disc 10, a signal processing unit 100 to detect focus error signals from signals detected by the optical pickup apparatus 50, a driving unit 307 to drive the spindle motor 312 and the optical pickup apparatus 50, and a control unit 309 to control focusing servo and tracking servo of the optical pickup apparatus 50. Reference numeral 352 denotes a turntable, and reference number 353 denotes a clamp to chuck the optical disc 10.

Light reflected by the optical disc 10 is detected by the photo detector 19 disposed in the optical pickup apparatus 50 and is converted to electric signals via photoelectric conversion. The signal processing unit 100 receives the electric signals and generates focus error signals (FES). The FES is input to the control unit 309 via the driving unit 307. The signal processing unit 100 may detect tracking error signals and/or tilting signals based on electric signals from the photo detector 19.

The driving unit 307 controls a speed at which the spindle motor 312 rotates, amplifies input signals, and drives the optical pickup apparatus 50. The control unit 309 sends a focus servo command, a tracking servo command, and/or a tilting servo command, which are adjusted based on signals input by the driving unit 307, back to the driving unit 307 for the optical pickup 50 to perform focus, track, and/or tilt operations. Furthermore, the control unit 309 controls the light source 11 to output light of an appropriate power according to reproducing/recording modes, and controls the driving unit 307 to apply a signal for defocus driving the objective lens 17 to the actuator 16, such that a focus offset is applied on the objective lens 17 prior to changing a current mode to the recording mode. At this point, the applied amount of the focus offset is adjusted according to the power of output light. After applying the focus offset for a predetermined time period, the focus offset may be removed.

An aspheric lens according to an embodiment of the present general inventive concept, which may be applied as the objective lens 17, includes at least one aspheric lens surface Sb. Thus, both surfaces of the aspheric lens may be aspheric lens surfaces Sb.

In the aspheric lens according to an embodiment of the present general inventive concept, an aspheric surface equation given by Equation 2 below may be used when designing an aspheric lens surface.

$$Z(r) = \frac{cr^2}{1+\sqrt{1-(1+K)c^2r^2}} + Lr^2 + Ar^4 + Br^6 + Cr^8 + Dr^{10} + Er^{12} + Fr^{14} + Gr^{16} + Hr^{18} + Jr^{20}$$ [Equation 2]

$$L \neq 0$$

where c is a curvature, $r^2 = x^2 + y^2$, K is a conic constant, and L and A through J are aspheric coefficients.

Here, x and y are a radius or distance from the optical axis and used to form the radius r at the point of the aspheric lens surface Sb with respect to the reference surface.

In other words, the aspheric lens 17 according to an embodiment of the present general inventive concept has an aspheric correction characteristic and can correct a curved surface of an aspheric lens surface, e.g., an elliptical surface, which is obtained according to the term of $$\frac{cr^2}{1+\sqrt{1-(1+K)c^2r^2}},$$

via a second term ($Lr^2$) indicating a parabolic surface.

Accordingly, when an aspheric correction is performed by using the second term indicating a parabolic surface (referred hereinafter as the second term), aberration can be corrected better than the case of, for example, an elliptical surface only. Therefore, loads in higher terms, that is, loads in the higher-order terms from term r4 to term r20 are relieved, and thus it also becomes possible to make gentle slope on a surface of the objective lens 17.

The aspheric lens according to an embodiment of the present general inventive concept may have an angle of inclination smaller than or equal to 65°, and may be formed of a plastic material. Alternatively, the aspheric lens may be formed of a glass material. As described above, the aspheric lens may be used as an objective lens for an optical pickup apparatus for BD. In this case, the NA of the aspheric lens may be 0.85.

Table 1 illustrated an example of designing the objective lens 17 according to an embodiment of the present general inventive concept. Data in Table 1 were obtained when the NA of the aspheric lens is 0.85, the effective diameter of the aspheric lens 17 is 3.4 mm, a center thickness of the aspheric lens corresponding to the optical axis is 1.76 mm, the refractive index of a material constituting the aspheric lens is 1.98, the focal length of the aspheric lens is 1.98 mm, and the working distance of the aspheric lens is 0.73 mm.

TABLE 1

|   | First Aspheric Lens Surface | Second Aspheric Lens Surface |
| --- | --- | --- |
| R (=1/c) | 1.6 | 4.136693 |
| K | −0.8379427 | −20.26923 |
| L | 1.44098E−02 | −5.45116E−02 |
| A | 1.80243E−02 | 8.66518E−02 |
| B | 2.86512E−03 | −9.40997E−02 |
| C | 1.91222E−05 | 5.44710E−02 |
| D | 2.12686E−04 | −1.67841E−02 |
| E | −0.922324E−05 | 2.12539E−03 |
| F | 0 | 0 |
| G | 0 | 0 |
| H | 0 | 0 |
| J | 0 | 0 |

As described above, when an aspheric lens surface is corrected via the second term, the angle of inclination on the lens surface of the aspheric lens can be gentle. As a result, the permitted axial deviation can be increased, and thus a manufacturing tolerance can be increased.

Although a few embodiments of the present invention have been shown and described, it would be appreciated by those skilled in the art that changes may be made in these embodiments without departing from the principles and spirit of the general inventive concept, the scope of which is defined in the claims and their equivalents.

What is claimed is:

1. An aspheric lens comprising at least one aspheric lens surface that is given by an equation $$Z(r) = \frac{cr^2}{1+\sqrt{1-(1+K)c^2r^2}} + Lr^2 + Ar^4 + Br^6 + Cr^8 + Dr^{10} + Er^{12} + Fr^{14} + Gr^{16} + Hr^{18} + Jr^{20}$$

where Z is a displacement of the at least one aspheric lens surface from a vertex of the aspheric lens, $L \neq 0$, c is a curvature, $r^2=x^2+y^2$, K is a conic integer, and L and A through J are aspheric coefficients, wherein x and y are horizontal and vertical distances from the optical axis of the aspheric lens to determine a radius r from the optical axis to the at least one aspheric lens surface.

2. The aspheric lens of claim 1, wherein the aspheric lens is formed of a plastic material.

3. The aspheric lens of claim 1, wherein the aspheric lens is used as an objective lens of an optical pickup apparatus for Blue-ray disc (BD).

4. The aspheric lens of claim 3, wherein an NA (numerical aperture) of the aspheric lens is 0.85.

5. An optical pickup apparatus comprising:
a light source to emit light; and
an objective lens to transmit the light and receive the light reflected from an disc, the objective lens comprising an aspheric lens having an aspheric lens surface that is given by an equation $$Z(r) = \frac{cr^2}{1+\sqrt{1-(1+K)c^2r^2}} + Lr^2 + Ar^4 + Br^6 + Cr^8 + Dr^{10} + Er^{12} + Fr^{14} + Gr^{16} + Hr^{18} + Jr^{20}$$

where Z is a displacement of the aspheric lens surface from a vertex of the aspheric lens, $L \neq 0$, c is a curvature, $r^2=x^2+y^2$, K is a conic integer, and L and A through J are aspheric coefficients, wherein x and y are horizontal and vertical distances from the optical axis of the aspheric lens to determine a radius r from the optical axis to the aspheric lens surface.

6. The optical pickup apparatus of claim 5, wherein the aspheric lens is used as an objective lens of an optical pickup apparatus for Blue-ray Disc (BD).

7. An optical information storage media system comprising:
an optical pickup apparatus comprising
a light source to emit light, and
an objective lens to transmit the light and receive the light reflected from an disc, the objective lens comprising an aspheric lens having an aspheric lens surface that is given by an equation $$Z(r) = \frac{cr^2}{1+\sqrt{1-(1+K)c^2r^2}} + Lr^2 + Ar^4 + Br^6 + Cr^8 + Dr^{10} + Er^{12} + Fr^{14} + Gr^{16} + Hr^{18} + Jr^{20}$$

where Z is a displacement of the aspheric lens surface from a vertex of the aspheric lens, $L \neq 0$, c is a curvature, $r^2=x^2+y^2$, K is a conic integer, and L and A through J are aspheric coefficients, wherein x and y are horizontal and vertical distances from the optical axis of the aspheric lens to determine a radius r from the optical axis to the aspheric lens surface; and a control unit to control the optical pickup apparatus to write and read information using the light.

8. The optical information storage media system of claim 7, wherein the aspheric lens is used as an objective lens of an optical pickup apparatus for Blue-ray Disc (BD).

9. An aspheric lens comprising at least one aspheric lens surface which can be determined by equation of:

$$Z(r) = \frac{cr^2}{1+\sqrt{1-(1+K)c^2r^2}} + Lr^2 + Ar^4 + Br^6 + Cr^8 + Dr^{10} + Er^{12} + Fr^{14} + Gr^{16} + Hr^{18} + Jr^{20}$$

where Z is a displacement of the aspheric lens surface from a vertex of the aspheric lens, $L \neq 0$, c is a curvature, $r^2=x^2+y^2$, K is a conic integer, and L and A through J are aspheric coefficients, and wherein x and y are horizontal and vertical distances from an optical axis of the aspheric lens to determine a radius r from the optical axis to the aspheric lens surface.

10. The aspheric lens of claim 9, wherein $Lr^2$ is a second term corresponding to a parabolic surface characteristic of the aspheric lens surface for aberration correction.

11. An aspheric lens usable as an objective lens of an optical information storage media system, the aspheric lens comprising at least one aspheric lens surface which can be determined by equation:

$$Z(r) = \frac{cr^2}{1+\sqrt{1-(1+K)c^2r^2}} + Lr^2 + X,$$

wherein Z is a displacement of the aspheric lens surface from a vertex of the aspheric lens, $L \neq 0$, c is a curvature, $r^2=x^2+y^2$, and K is a conic integer, and wherein x and y are horizontal and vertical distances from an optical axis of the aspheric lens to determine a radius r from the optical axis to the aspheric lens surface, wherein $$\frac{cr^2}{1+\sqrt{1-(1+K)c^2r^2}}$$

is a first term corresponding to an elliptical surface characteristic, $Lr^2$ is a second term corresponding to a parabolic surface characteristic: and X includes higher-order terms corresponding to slope characteristics of the aspheric lens surface.

12. The aspheric lens of claim 11, wherein:
the higher-order terms comprises $Ar^4+Br^6+Cr^8+Dr^{10}+Er^{12}+Fr^{14}+Gr^{16}+Hr^{18}+Jr^{20}$, where L and A through J are aspheric coefficients.

13. The aspheric lens of claim 11, wherein an NA (numerical aperture) of the aspheric lens is 0.85.

14. An optical pickup apparatus comprising:
a light source to emit light; and
an objective lens to transmit the light and receive the light reflected from an disc, wherein the objective lens comprises an aspheric lens having an aspheric lens surface which can be determined by equation:

$$Z(r) = \frac{cr^2}{1 + \sqrt{1 - (1+K)c^2r^2}} + Lr^2 + Ar^4 + Br^6 + Cr^8 + Dr^{10} + Er^{12} + Fr^{14} + Gr^{16} + Hr^{18} + Jr^{20}$$

a first term corresponding to an elliptical surface characteristic;
a second term corresponding to a parabolic surface characteristic: and
higher-order terms corresponding to slope characteristics of the aspheric lens surface,
wherein Z is a displacement of the aspheric lens surface from a vertex of the aspheric lens, $L \ne 0$, c is a curvature, $r^2 = x^2 + y^2$, K is a conic integer, and L and A through J are aspheric coefficients, and
wherein x and y are horizontal and vertical distances from an optical axis of the aspheric lens to determine a radius r from the optical axis to the aspheric lens surface.

15. An optical information storage media system comprising:
an optical pickup apparatus comprising
a light source to emit light, and
an objective lens to transmit the light and receive the light reflected from an disc,
wherein the objective lens comprises an aspheric lens having an aspheric lens surface which can be determined by equation $$Z(r) = \frac{cr^2}{1 + \sqrt{1 - (1+K)c^2r^2}} + Lr^2 + Ar^4 + Br^6 + Cr^8 + Dr^{10} + Er^{12} + Fr^{14} + Gr^{16} + Hr^{18} + Jr^{20}$$

wherein $$\frac{cr^2}{1 + \sqrt{1 - (1+K)c^2r^2}}$$

is a first term corresponding to an elliptical surface characteristic, $Lr^2$ is a second term corresponding to a parabolic surface characteristic, and X includes higher-order terms corresponding to slope characteristics of the aspheric lens surface; and
a control unit to control the optical pickup apparatus to write and read information using the light,
wherein Z is a displacement of the aspheric lens surface from a vertex of the aspheric lens, $L \ne 0$, c is a curvature, $r^2 = x^2 + y^2$, K is a conic integer, and L and A through J are aspheric coefficients, and
wherein x and y are horizontal and vertical distances from an optical axis of the aspheric lens to determine a radius r from the optical axis to the aspheric lens surface.

* * * * *